(12) United States Patent
Yao

(10) Patent No.: US 10,657,247 B2
(45) Date of Patent: May 19, 2020

(54) ERROR CORRECTION CIRCUIT FOR PHYSICAL UNCLONABLE FUNCTION (PUF) CIRCUIT

(71) Applicant: NXP B.V., San Jose, CA (US)

(72) Inventor: Xiaoxu Yao, Shanghai (CN)

(73) Assignee: NXL B.V., Eindhoven (NL)

( * ) Notice: Subject to any disclaimer, the term of this patent is extended or adjusted under 35 U.S.C. 154(b) by 166 days.

(21) Appl. No.: 15/702,765

(22) Filed: Sep. 13, 2017

(65) Prior Publication Data

US 2019/0065734 A1 Feb. 28, 2019

(30) Foreign Application Priority Data

Aug. 28, 2017 (CN) .......................... 2017 1 0750196

(51) Int. Cl.
| | |
|---|---|
| *G06F 12/14* | (2006.01) |
| *G06F 21/44* | (2013.01) |
| *H04L 9/32* | (2006.01) |
| *G06F 21/31* | (2013.01) |
| *G06F 21/73* | (2013.01) |

(52) U.S. Cl.
CPC ............ *G06F 21/445* (2013.01); *G06F 21/31* (2013.01); *G06F 21/73* (2013.01); *H04L 9/3249* (2013.01); *H04L 9/3271* (2013.01); *H04L 9/3278* (2013.01); *G06F 2221/2115* (2013.01); *G06F 2221/2129* (2013.01); *H04L 2209/12* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 3,573,728 | A | 4/1971 | Kolankowsky |
| 6,694,477 | B1 | 2/2004 | Lee |
| 8,290,150 | B2 | 10/2012 | Erhart |
| 8,525,169 | B1 | 3/2013 | Edelstein |
| 8,516,269 | B1 | 8/2013 | Hamlet |
| 8,782,396 | B2 | 7/2014 | Ziola et al. |
| 9,584,329 | B1 * | 2/2017 | Trimberger ........... H04L 9/3278 |
| 2013/0185611 | A1 * | 7/2013 | Goettfert ............. G06F 11/1008 714/766 |
| 2014/0325237 | A1 * | 10/2014 | Van Der Leest ....... G06F 21/72 713/189 |
| 2015/0089310 | A1 | 3/2015 | Motwani et al. |

FOREIGN PATENT DOCUMENTS

CN 104216665 B 3/2017

OTHER PUBLICATIONS

Abhishek Kumar; Ravi Shankar Mishra; K.R. Kashwan, Challenge-Response Generation Using RO-PUF with Reduced Hardware , 2016 Intl. Conference on Advances in Computing, Communications and Informatics (ICACCI), Jaipur, India, Sep. 21-24, 2016.
Gassend et al., "Silicon Physical Random Functions," MIT Laboratory for Computer Science, CCS '02, Nov. 18-22, 2002, 13 pages.

* cited by examiner

*Primary Examiner* — Brandon S Hoffman

(57) ABSTRACT

An error correction circuit for a physical unclonable function (PUF) circuit includes a redundant bits memory, an output rectifier circuit, an error comparator, error counter, error bits memory, error update comparator, output update circuit, and a redundant bits update circuit. The error correction circuit identifies permanent error bits in a set of output bits of the PUF circuit, eliminates the permanent error bits, and generates a set of updated output bits.

19 Claims, 5 Drawing Sheets

ERROR CORRECTION CIRCUIT FOR PHYSICAL UNCLONABLE FUNCTION (PUF) CIRCUIT

BACKGROUND

The present invention relates generally to physical unclonable function (PUF) circuits, and more particularly, to an error correction circuit for a PUF circuit.

Financial institutions, governments, and consumer companies, to name a few, generate large amounts of confidential data daily. Confidential data includes financial data, operational data, and personal data of individuals and businesses. Unfortunately, such confidential data often is subject to hacking, so data security and prevention of data theft is extremely important. Cryptography is an essential tool for providing data security in most communication networks. Data security implemented via software typically uses confidential keys such as passwords, personal identification numbers (PIN) and the like, which are stored in a memory. Hackers often try to obtain confidential data by accessing the memory and stealing the confidential keys. To prevent external attacks, physical unclonable function (PUF) circuits are used.

PUF circuits are specialized circuits with applications including key generation and challenge-response authentication. Because of random process variations, no two integrated circuits, even with the same layouts, are identical. Variation is inherent in the fabrication process, and relative variation increases as the fabrication process advances. That is, silicon-based PUFs have differences in their microstructure due to variance in manufacturing conditions. Hence, silicon-based PUFs usually are tamper-proof and resistant to cloning. Delay-based silicon PUF capitalizes on the existence of these variations and uses the unique delay characteristics of each chip to generate secret keys. For example, in a challenge-response system, different PUFs generate distinct responses to the same challenge due to differences in microstructures of the PUFs.

One challenge with PUF circuits is ensuring that the PUF circuit is operating correctly. For example, a PUF circuit may receive an N bit challenge and generate an M bit response. Due to aging and variations in physical conditions, the PUF circuit may generate an erroneous M bit response, which will lead to problems in authenticating the PUF circuit. Errors in the M bit response may be categorized as temporary errors and permanent errors. Temporary errors are caused by varying physical conditions such as temperature, voltage fluctuations, electro-magnetic interference, and the like, while permanent errors are caused by aging of the PUF circuit. The permanent errors do not depend on the physical conditions.

To address the problem of errors, an error correction circuit may be used. An error correction circuit will receive the erroneous response, correct the errors, and provide a corrected response. However, the number of errors that can be corrected by the error correction circuit is limited by a threshold value. And due to aging, the errors may increase over time. If the number of errors is greater than the threshold value, then the error correction circuit will be unable to correct the additional errors and the PUF circuit will output an erroneous response. Errors due to aging may be caused by a decline in health of the PUF circuit.

Hence, it would be advantageous to have a health indicating circuit for a PUF circuit that can identify a decline in health of the PUF circuit. It also would be advantageous to be able to compensate for permanent errors caused by aging.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
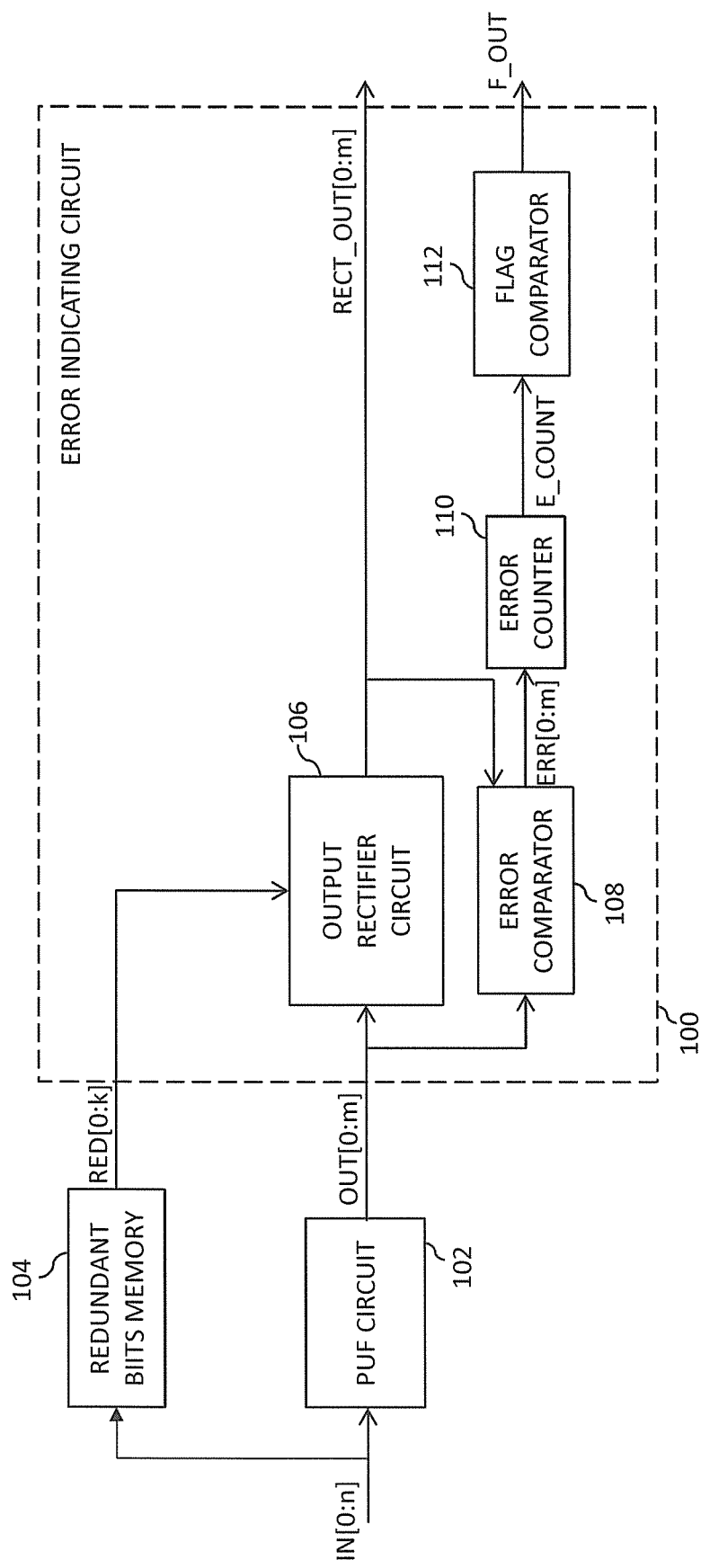
FIG. 1 is a schematic block diagram of an error indicating circuit for determining if a PUF circuit is functioning optimally, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides an error indicating circuit connected to a PUF circuit, where the PUF circuit receives a challenge as a set of input bits and generates a response as a set of output bits. The set of input bits is encoded to provide access to a set of redundant bits stored in a redundant bits memory. The error indicating circuit includes an output rectifier circuit connected to the PUF circuit and the redundant bits memory. The output rectifier circuit receives the set of output bits and the set of redundant bits, respectively, and generates a set of rectified output bits. An error comparator is connected to the PUF circuit and the output rectifier circuit. The error comparator receives the set of output bits and the set of rectified output bits, respectively, and generates a set of error bits based on a bitwise comparison of the set of output bits with the set of rectified output bits. A first error counter is connected to the error comparator, receives the set of error bits, and generates an error count value based on the set of error bits. A flag comparator is connected to the first error counter, receives the error count value, and sets a flag when the error count value is greater than a first threshold value. The flag provides an indication of the health of the PUF circuit.

The error comparator sets an error bit of the set of error bits when an output bit of the set of output bits does not match a corresponding rectified output bit of the set of output bits. The error count value generated by the first error counter comprises a sum of the error bits of the set of error bits that are set. If the output rectifier circuit is able to correct say 'n' bits of the set of output bits, for example using forward error correcting, then the first threshold value is n−1 or less, so that the flag is raised before the circuit will not be able to correct all of the detected errors. Thus, the flag indicates that the number of errors corrected by the output rectifier circuit is approaching a maximum number of errors correctable by the output rectifier circuit.

In another embodiment, the present invention provides an error correcting circuit connected to a PUF circuit. The error correcting circuit includes the output rectifier, and error comparator of the above embodiment, and a second error counter that is connected to the error comparator. The second error counter receives the set of error bits and generates a set of count values that indicates, for each of the error bits, a number of operation cycles of the PUF circuit for which each said bit has not changed state. An error update comparator is connected to the second error counter, receives the set of count values, identifies count values that are greater than a second threshold value, and generates a corresponding set of flag bits, where a flag bit is set when the corresponding count value is greater than the second threshold value. The flag bits, when set, indicate that the corresponding error bit comprises a permanent error.

The second error counter may be connected to an error bits memory to facilitate generating cumulative count values for each of the error bits. An output update circuit may be connected to the error update comparator for receiving the flag bits and generating a set of updated output bits based on the flag bits. The updated output bits may be output from the error correcting circuit, where the updated output bits indicate that for a next usage of the PUF circuit, the rectified output will include a correction of the permanent error. A redundant bits update circuit may be connected to the output update circuit for receiving the updated output bits, generating a set of updated redundant bits, and storing the updated redundant bits in the redundant bits memory.

In one embodiment, the redundant bits memory is part of the error correcting circuit, and the redundant bits memory comprises a programmable read-only-memory (ROM), which allows updated redundant bits to be stored in the memory to dynamically correct detected permanent errors.

In yet another embodiment, the present invention provides a method for determining the health of a PUF circuit, where the PUF circuit receives a challenge as a set of input bits and generates a response as a set of output bits. The method includes generating a set of rectified output bits with an output rectifier circuit using the set of output bits and a set of redundant bits, and comparing the set of output bits with the set of rectified output bits by an error comparator to generate a set of error bits. An error bit has a first value if the corresponding output bit matches the corresponding rectified output bit, and a second value if the corresponding output bit does not match the corresponding rectified output bit. The method further includes generating an error count value with a first error counter, where the error count value is a sum of the number of bits of the set of error bits that have the second value. The error count value is compared with a first threshold value and a flag is set if the error count value is greater than the first threshold value. The flag provides an indication of the health of the PUF circuit.

Various embodiments of the present invention include a system and method for updating a response of a challenge to a PUF circuit. The PUF circuit receives a set of input bits and generates a set of output bits. An output rectifier circuit generates a set of rectified output bits based on a set of redundant bits and the output bits. An error comparator compares the output bits and the rectified output bits and generates a set of error bits. An error counter counts the occurrences of errors detected by the error comparator (i.e., counts how many times each error has occurred). An error update comparator determines if the counted number of errors exceeds a predetermined threshold value, and generates a flag. An output update circuit receives the flag and generates a set of updated output bits. A redundant bits update circuit receives the updated output bits and identifies updated redundant bits of the updated output bits. In this way, if the same error occurs more than a predetermined number of times, a flag is set indicating the error to be permanent. Then the redundant bits memory is updated to accommodate for any such permanent errors.

The system for updating the response to the challenge to the PUF circuit eliminates permanent error bits, and hence facilitates a longer useful life of the PUF circuit.

Referring now to FIG. 1, a schematic block diagram of an error indicating circuit 100 for a PUF circuit 102, in accordance with an embodiment of the present invention, is shown. The error indicating circuit 100 is used to determine a functional condition (i.e., the health) of the PUF circuit 102. The PUF circuit 102 receives a challenge as a set of input bits IN[0:n]. In response to the challenge, the PUF circuit 102 generates a response as a set of output bits OUT[0:m]. As understood by those of skill in the art, the output out[0:m] of the PUF circuit 102 depends on physical conditions surrounding the PUF circuit 102, such as temperature and voltage fluctuations. Such variations may invert one or more of the output bits OUT[0:m]. However, the inversion of any of the output bits OUT[0:m] due to variations in the physical operating conditions are considered to be temporary errors because the physical conditions may change and thus the inversion may not occur again or will not occur again unless the same conditions reoccur. Hence, the PUF circuit 102 may generate an erroneous response to a challenge depending on the variations in the physical conditions surrounding the PUF circuit 102.

A redundant bits memory 104 also receives the challenge IN[0:n}. The input bits IN[0:n], which are encoded, provide an address to the memory 104 to access a set of redundant bits [0:k} stored in the memory 104. In the presently preferred embodiment, the redundant bits memory includes 2n+1 sets of redundant bits. The set of input bits IN[0:n] includes at least one of the $2^{n+1}$ sets of redundant bits. Although the redundant bits memory 104 is shown as a separate entity, in some embodiments the redundant bits memory 104 is a part of the PUF circuit 102 and in other embodiments, the redundant bits memory is a part of the error indicating circuit 100. In the embodiment shown in FIG. 1, the redundant bits memory 104 preferably comprises a read-only-memory (ROM) that is not updateable. The PUF circuit 102 and the redundant bits memory 104 may comprise types of PUF circuits and redundant bits memories that are known by those of skill in the art.

The error indicating circuit 100 includes an output rectifier circuit 106, an error comparator 108, a first error counter 110, and a flag comparator 112.

The output rectifier circuit 106 receives the output bits OUT[0:m] from the PUF circuit 102 and the redundant bits RED[0:k] from the memory 104. The output rectifier circuit 106 is configured for correcting errors in the output bits OUT[0:m]. In a presently preferred embodiment, the output rectifier circuit 106 includes a forward error correction (FEC) code for correcting errors in the output bits OUT[0:m]. The FEC code corrects the errors using the redundant bits RED[0:k], and generates a set of rectified output bits RECT_OUT[0:m]. As will be understood by those of skill in the art, 'n' and 'm' are natural numbers and may be set to have different values depending on the security level desired. For example, if m is small, such as 8, then security may be low because an exhaustive search could be used to match or map responses to challenges. 'k' also is a natural number and is less than m; the number of errors that can be corrected is less than k. Those of skill in the art will understand that the output rectifier circuit 106 can use various error correction algorithms and as such, the invention is not limited to FEC circuits.

The error comparator 108 receives the response OUT[0:m] generated by the PUF circuit 102 and the set of rectified output bits RECT_OUT[0:m] from the output rectifier circuit 106, performs a bitwise comparison of the output bits OUT[0:m] and the rectified output bits RECT_OUT[0:m], and generates a set of error bits ERR[0:m]. In one embodiment, the error comparator 108 includes "m" XOR gates (not shown), where each of the "m" XOR gates receives one of the output bits OUT[0:m] and a corresponding one of the rectified output bits RECT_OUT[0:m]. In one example, the error comparator 108 includes first through tenth XOR gates, and in this example, the first, second and tenth bits of the output bits OUT[0:m] are different from the first, second and tenth bits of the rectified output bits RECT_OUT[0:m]. Hence, the error comparator 108 outputs ERR[0:9]='1100000001'.

The first error counter 110 counts the number of bits of the set of error bits ERR[0:m], and outputs an error count E_COUNT. In the aforementioned example, the error counter 110 receives the set of error bits ERR[0:9] '1100000001' and generates an error count value E_COUNT of three. Note, for each challenge IN[0:n] there is a new response OUT[0:m], and the count value only pertains to the current challenge/response. That is, the count value E_COUNT is not cumulative.

The flag comparator 112 receives the count value E_COUNT from the error comparator 108. For example, if the set of output bits OUT[0:m] is '1001011', and the set of rectified output bits RECT_OUT[0:m] is '1000101', then the fourth, fifth and sixth bits output bits OUT[0:m] are erroneous. Hence, the error bits ERR[0:m] generated by the error comparator 108 comprise the bit string '0001110', and the error count value E_COUNT generated by the first error counter 110 is three.

The flag comparator 112 receives the error count value E_COUNT from the first error counter 110 and compares E_COUNT to a first threshold value. If the error count value E_COUNT is greater than the first threshold value, then the flag comparator 112 sets a flag F_OUT, which indicates that the health of the PUF circuit 102 is declining. Thus, if the flag F_OUT is set, then if appropriate action for replacing the PUF circuit 102 is not taken, the PUF circuit 102 may reach a total failure because the output rectifier circuit 106 may not be able to rectify all of the detected errors. On the other hand, if the error count value E_COUNT is less than the first threshold value, the flag F_OUT is not set. When the flag F_OUT is not set, then the health of the PUF circuit 102 is considered to be okay because the output rectifier circuit 106 should be able to correct any/all of the errors in the response OUT[0:m]. That is, there are not too many errors for the output rectifier circuit 106 to correct. In the presently preferred embodiment, the first threshold value is set to a number that is less than a maximum number of errors that can be corrected by the output rectifier circuit 106 so that adequate warning is provided before the occurrence of too many errors than can be fixed.

For example, if the first threshold value is set at five (5), then the output rectifier circuit 106 should be able to rectify at least five erroneous bits of the set of output bits OUT[0:m], and preferably the output rectifier circuit 106 could rectify at least six (6) errors in the response OUT[0:m].

Then, when the error count value E_COUNT reaches five, the flag comparator 112 sets the flag F_OUT.

In one embodiment, the error indicating circuit 100 indicates multiple health levels of the PUF circuit 102. If the error count value E_COUNT lies between an intermediate first threshold value and the first threshold value, the flag comparator 112 sets an intermediate flag (not shown). If the intermediate flag is set, then the output rectifier circuit 106 can rectify the error bits ERR[0:m] of the set of output bits OUT[0:m]. If the error count value E_COUNT is greater than the first threshold, the flag comparator 112 sets the flag F_OUT. If the flag F_OUT is set, it indicates that the health of the PUF circuit 102 has declined to the point that it should be changed. If the error count value is less than the intermediate first threshold, the flag comparator 112 does not set either the intermediate flag or the flag F_OUT, which indicates that the health of the PUF circuit 102 has not declined. It will be understood by those of skill in the art that if set means set to a high logic value, i.e., "1", then "not set" means the flags are at a low logic value, i.e., "0".

Figure 2:
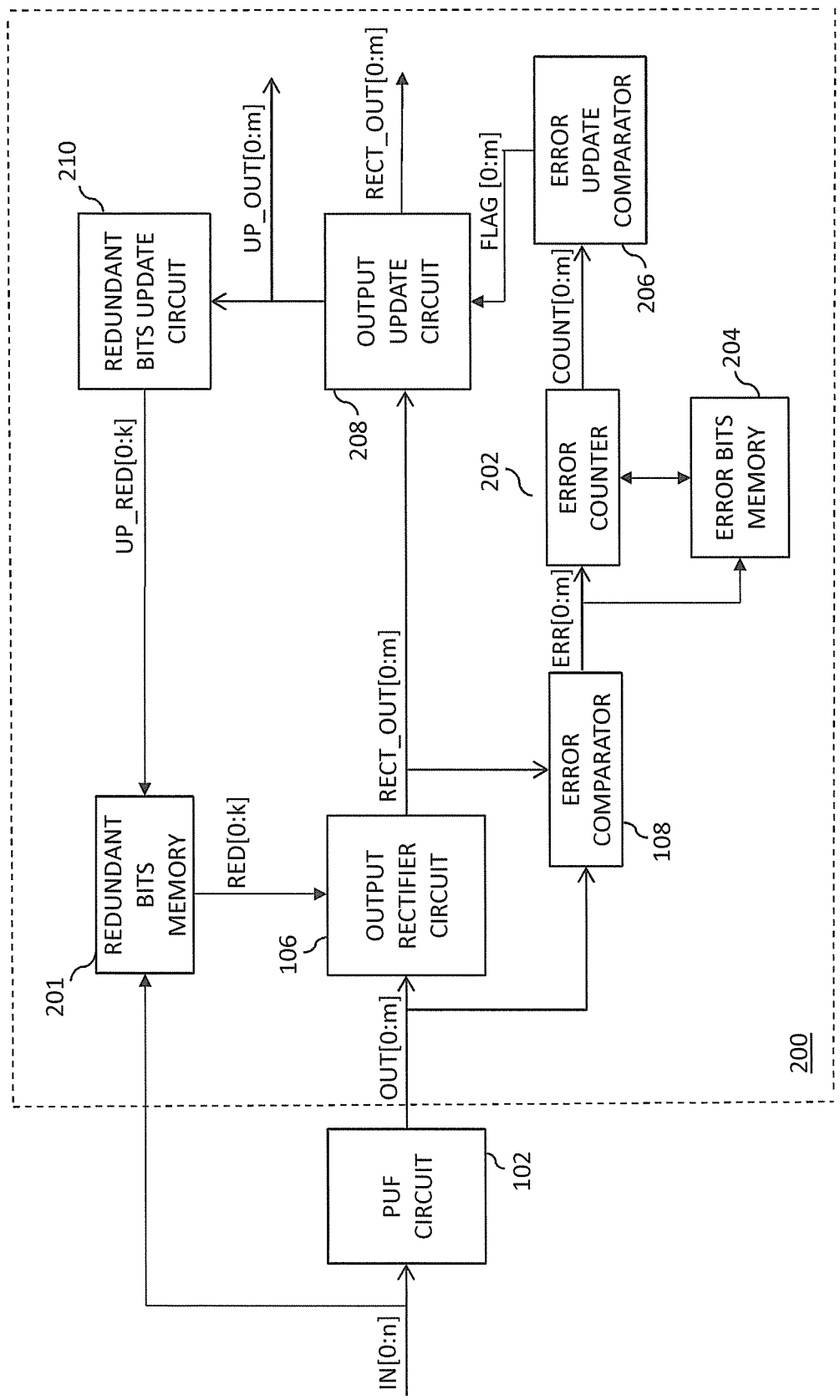
FIG. 2 is a schematic block diagram of an error correction circuit in accordance with an embodiment of the present invention.

Referring now to FIG. 2, a schematic block diagram of an error correction circuit 200, in accordance with an embodiment of the present invention, is shown. The error correction circuit 200 is connected to a PUF circuit 102. When the PUF circuit 102 receives a challenge IN[0:n] and generates a response OUT[0:m], the error correction circuit 200 receives the response OUT[0:m].

In this embodiment, the error correction circuit 200 includes a redundant bits memory 201, an output rectifier circuit 106, an error comparator 108, a second error counter 202, an error bits memory 204, an error update comparator 206, an output update circuit 208, and a redundant bits update circuit 210. The structure and operation of the PUF circuit 102, the redundant bits memory 201, the output rectifier circuit 106, and the error comparator 108 of FIG. 2 are similar to the structure and operation the same elements shown and described with reference to FIG. 1, except for the redundant bits memory 201, which in this embodiment is writeable so may comprise a programmable ROM, as will be described in more detail below.

The second error counter 202 receives the set of error bits ERR[0:m] from the error comparator 108. The set of error bits ERR[0:m] may include both temporary and permanent error bits. Temporary error bits are caused by variations in physical operating conditions such as temperature and voltage fluctuations. The temporary error bits usually vary over operation cycles of the PUF circuit 102. However, one or more bits of the set of error bits ERR[0:m] may be constant over multiple operation cycles of the PUF circuit 102. The bits that are constant over the multiple operation cycles of the PUF circuit 102 are considered to indicate permanent errors. Permanent errors bits are usually generated due to aging of the PUF circuit 102. Physical intrusion into the PUF circuit 102 may also be the cause of permanent error bits.

The second error counter 202, operating in conjunction with the error bits memory 204, measures variation in the error bits ERR[0:m] over multiple operation cycles of the PUF circuit 102. That is, the second error counter 202 maintains a count of the number of operation cycles for which each error bit ERR[0:m] remains at a constant logic state, and stores the error bits ERR[0:m] of each operation cycle of the PUF circuit 102 and current count values in the error bits memory 204. More particularly, the second error counter 202 generates a set of count values COUNT[0:m] based on the set of error bits ERR[0:m] and a previous count value. Each count value COUNT[0:m] signifies the number of consecutive operation cycles of the PUF circuit 102 over which the corresponding error bit ERR[0:m] remains constant. For example, if the error bits ERR[0:6] is '1001010', then the second error counter 202 generates the count values COUNT[0:6] corresponding to the seven error bits ERR[0:6]. If, for example, the second, third and fifth error bits ERR[0:6] are constant for six operation cycles of the PUF circuit 102 and the other error bits ERR[0:6] vary over the six operational cycles, then the count value COUNT[0:6] is '0660600'.

The error update comparator 206 receives the count values COUNT[0:m] from the second error counter 202, and generates a set of flag bits FLAG[0:m] corresponding to the set of error bits ERR[0:m] based on the count values COUNT[0:m]. If any count value of the set of count values COUNT[0:m] is greater than a second threshold value, the error update comparator 206 sets a corresponding flag bit of the set of flag bits FLAG[0:m]. The flag bits FLAG[0:m] that are set indicate that the corresponding error bits ERR[0:m] are permanent error bits. For example, if the second threshold value is set at five operation cycles of the PUF circuit 102, and the first, second, and fourth error bits ERR[0], ERR[1] and ERR[3] have the same values for six operation cycles of the PUF circuit 102, then the first, second, and fourth error bits ERR[0], ERR[1], and ERR[3] are determined to be permanent errors and the first, second, and fourth flag bits FLAG[0], FLAG[1], and FLAG[3] are set.

In other embodiments, the second error counter 202 counts the cycles, for each error bit, that a bit remains constant, but if one of the error bits changes state in one cycle, then the second error counter will decrement the current count value for that bit. In this way, the error correction circuit 200 can assess the probability that an error is a permanent error. For example, if over five (5) operation cycles one of the bits is set four of the five times, then there is a good probability of a permanent error. Other counting algorithms also may be used, for example, decrement by two (2) if a bit changes state (but the count value does not go below zero).

The output update circuit 208 is connected to the output rectifier circuit 106, the error update comparator 206, and the redundant bits update circuit 210. The output update circuit 208 receives the flag bits FLAG[0:m] from the error update comparator 206, and generates a set of updated output bits UP_OUT[0:m] based on the flag bits FLAG[0:m]. More particularly, the output update circuit 208 inverts the permanent error bits of the set of error bits ERR[0:m] to generate a set of updated output bits UP_OUT[0:m]. The updated output bits UP_OUT[0:m] are output from the circuit 200 so that a user of the PUF circuit 102 will be aware that for the next usage of the PUF circuit 102, the rectified output RECT_OUT[0:m] will include a correction to the permanent error bits.

The redundant bits update circuit 210 also receives the set of updated output bits UP_OUT[0:m] from the output update circuit 208, and generates a set of updated redundant bits UP_RED[0:k] based on the updated output bits UP_OUT[0:m]. The redundant bits update circuit 210 stores the updated redundant bits UP_RED[0:k] in the redundant bits memory 201, replacing the redundant bits RED[0:k] stored therein so that in later operation cycles of the PUF circuit 102, the output rectifier circuit 106 generates the rectified output bits RECT_OUT[0:m] using the updated redundant bits UP_RED[0:k].

For example, if in an eighth operational cycle of the PUF circuit 102, the error comparator 108 generates the error bits for the eighth operational cycle ERR[0:m]$_8$ (hereinafter referred to as "eighth set of error bits") as '0101001010', and in this instance the second, fourth, and eighth error bits ERR[1], ERR[3], and ERR[7] have been constant for eight operation cycles of the PUF circuit 102, and the other error bits of the eighth set of error bits ERR[0:m]$_8$ have varied over the eight operation cycles of the PUF circuit 102, then the second error counter 202 generates the count values for the eighth operation cycle COUNT[0:m]$_8$ (hereinafter referred to as "eighth set of count values") as '0808000800'. Then, if the second threshold value is set at eight operation cycles of the PUF circuit 102, the error update comparator 206 sets the flag bits for the eighth operation cycle FLAG[0:m]$_8$ (hereinafter referred to as "eighth set of flag bits") as '0101000100'. The output update circuit 208 receives the eighth set of flag bits FLAG[0:m]$_8$ and generates the eighth set of updated output bits UP_OUT[0:m]$_8$. The redundant bits update circuit 210 generates the updated redundant bits of the eighth operation cycle UP_RED[0:k]$_8$, which is the set of redundant bits RED[0:k]$_9$ for the ninth operation cycle of PUF circuit 102.

Thus, from the circuit structures shown in FIGS. 1 and 2, the present invention can provide a flag indicating the health of a PUF circuit when there are almost more error bits than can be compensated for, and can detect and accommodate permanent errors using the output update circuit 208, the redundant bits update circuit 210, and the redundant bits memory 104. Of course, in some embodiments of the present invention, an error correction circuit provides both a PUF health indication and permanent error bit correction.

Figure 3:
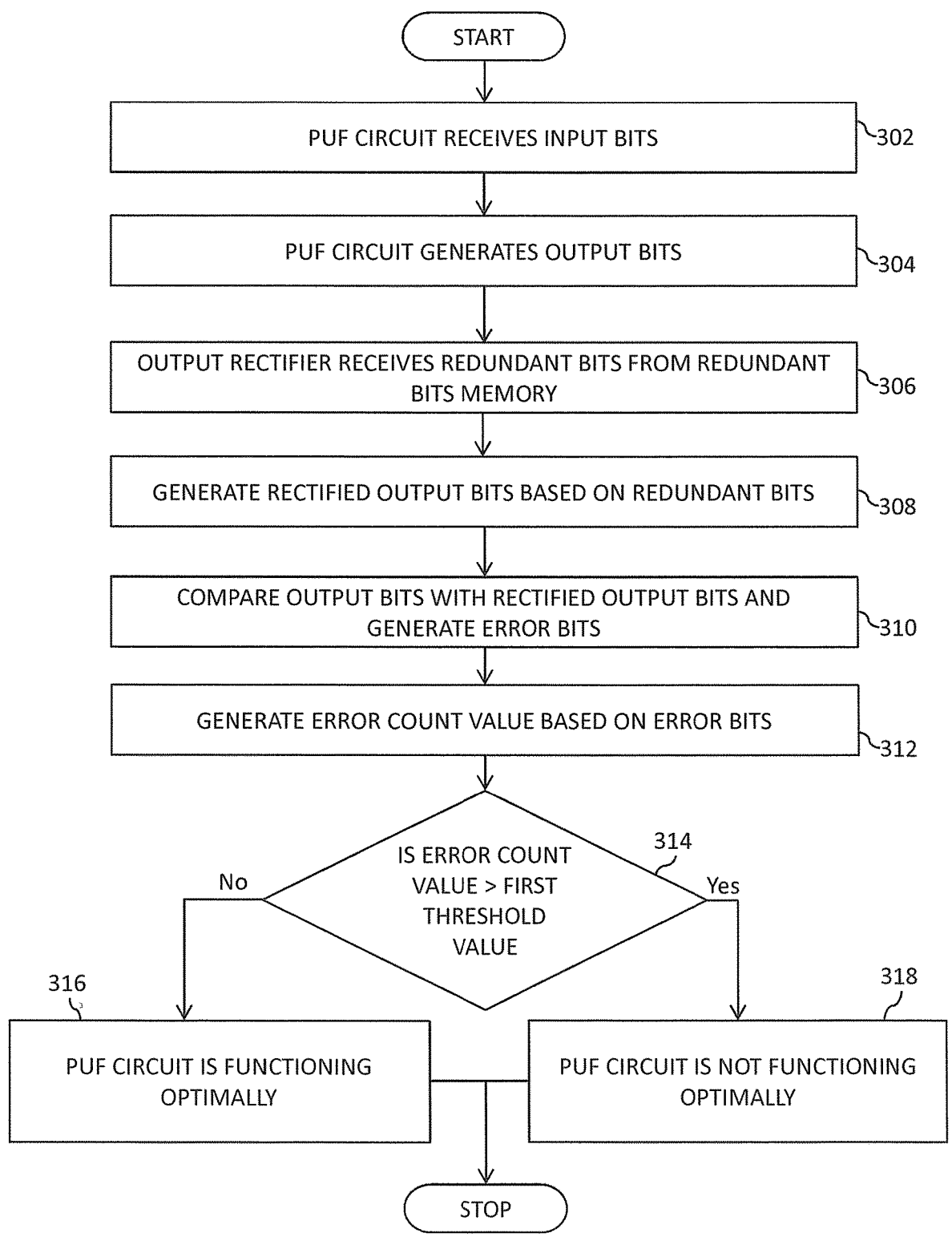
FIG. 3 is a flow chart illustrating a method for determining if the PUF circuit of FIG. 1 is functioning optimally, in accordance with an embodiment of the present invention.

Referring now to FIG. 3, a flow chart of a method for indicating a health condition of the PUF circuit 102 of FIG. 1 is shown, in accordance with an embodiment of the present invention. At step 302, the PUF circuit 102 receives a set of input bits IN[0:n], and at step 304, the PUF circuit 102 generates a set of output bits OUT[0:m] based on the set of input bits IN[0:n]. The set of input bits IN[0:n] is encoded, as is known in the art, and is provided to the redundant bits memory 104 as an address such that the set of redundant bits RED[0:k] is read from the memory 104. At step 306, the output rectifier circuit 106 receives the redundant bits RED[0:k] from the redundant bits memory 104, and at step 308, the output rectifier circuit 106 generates a set of rectified output bits RECT_OUT[0:m] based on the output bits[0:m] and the redundant bits RED[0:k]. In one embodiment, the output rectifier circuit 106 employs a FEC code for rectifying the errors in the output bits OUT[0:m].

At step 310, the error comparator 108 receives the output bits OUT[0:m] and the rectified output bits RECT_OUT[0:m] from the PUF circuit 102 and the output rectifier circuit 106, respectively, and performs a bitwise comparison and generates a set of error bits ERR[0:m] based on the comparison. At step 312, the first error counter 110 generates an error count value E_COUNT based on set of error bits ERR[0:m], and provides the error count value E_COUNT to the flag comparator 112. At step 314, the flag comparator 112 determines if the error count value E_COUNT is greater than a first threshold value. If the error count value E_COUNT is less than the first threshold value, the flag comparator 112 executes step 316. At step 316, the flag comparator 112 sets the flag output F_OUT so that F_OUT does not indicate that the PUF circuit 102 is in bad health (e.g., if F_OUT=1 indicates bad health than F_OUT=0 indicates not bad health). If at step 314 the flag comparator 112 determines that the error count value E_COUNT is greater than or equal to the first threshold value, then the flag comparator 112 executes step 318. At step 318, the flag comparator 112 sets the flag output F_OUT to indicate that the PUF circuit 102 has a health condition, i.e., there are just fewer errors than correctable by the output rectifier circuit 106 such that if any more errors occur, the error correction circuit 100 will not be able to correct all of them.

Figure 4A:
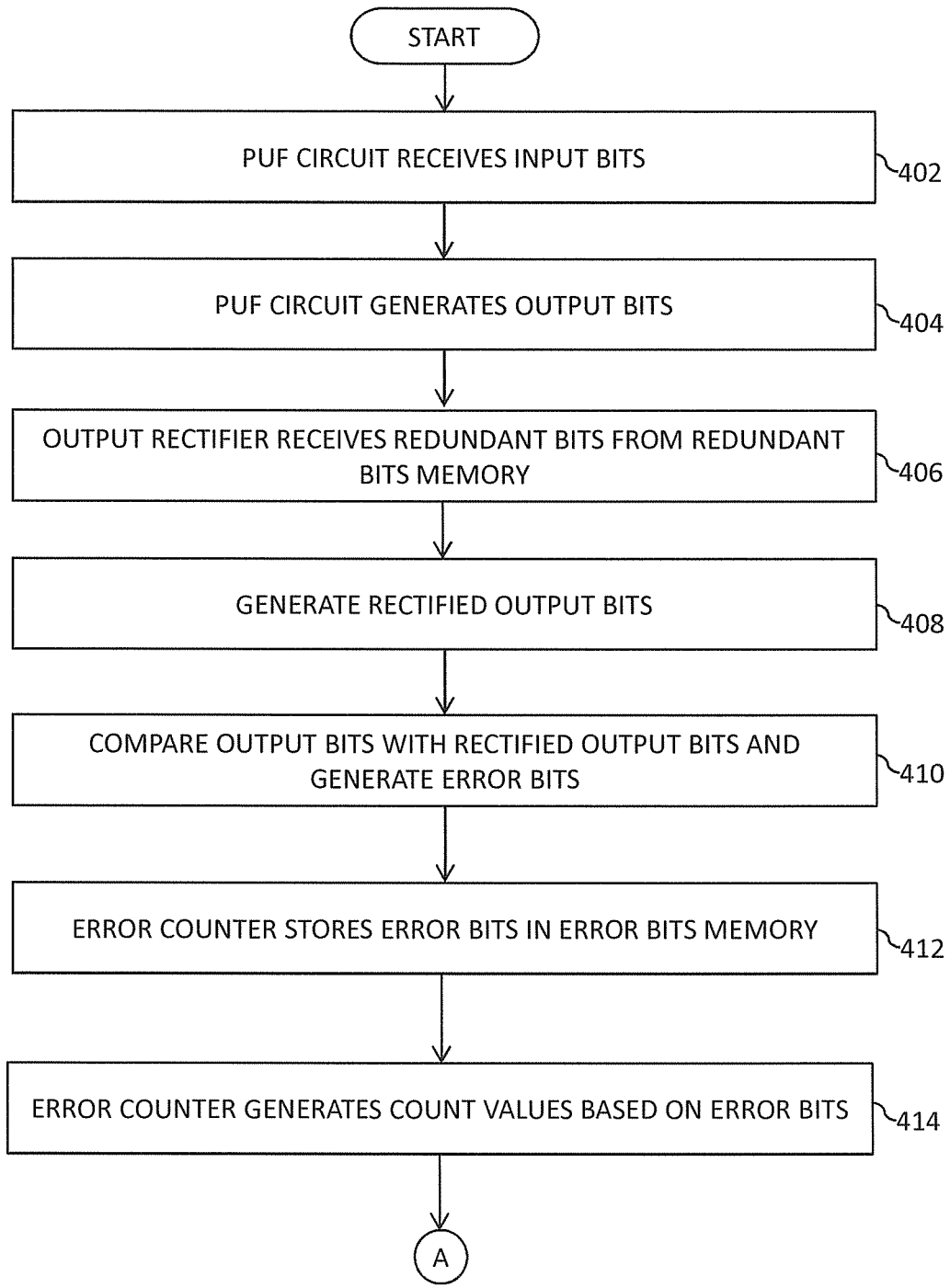
FIGS. 4A and 4B are a flow chart illustrating a method for updating a response to a challenge issued to the PUF circuit of FIG. 2 in accordance with an embodiment of the present invention.
Figure 4B:
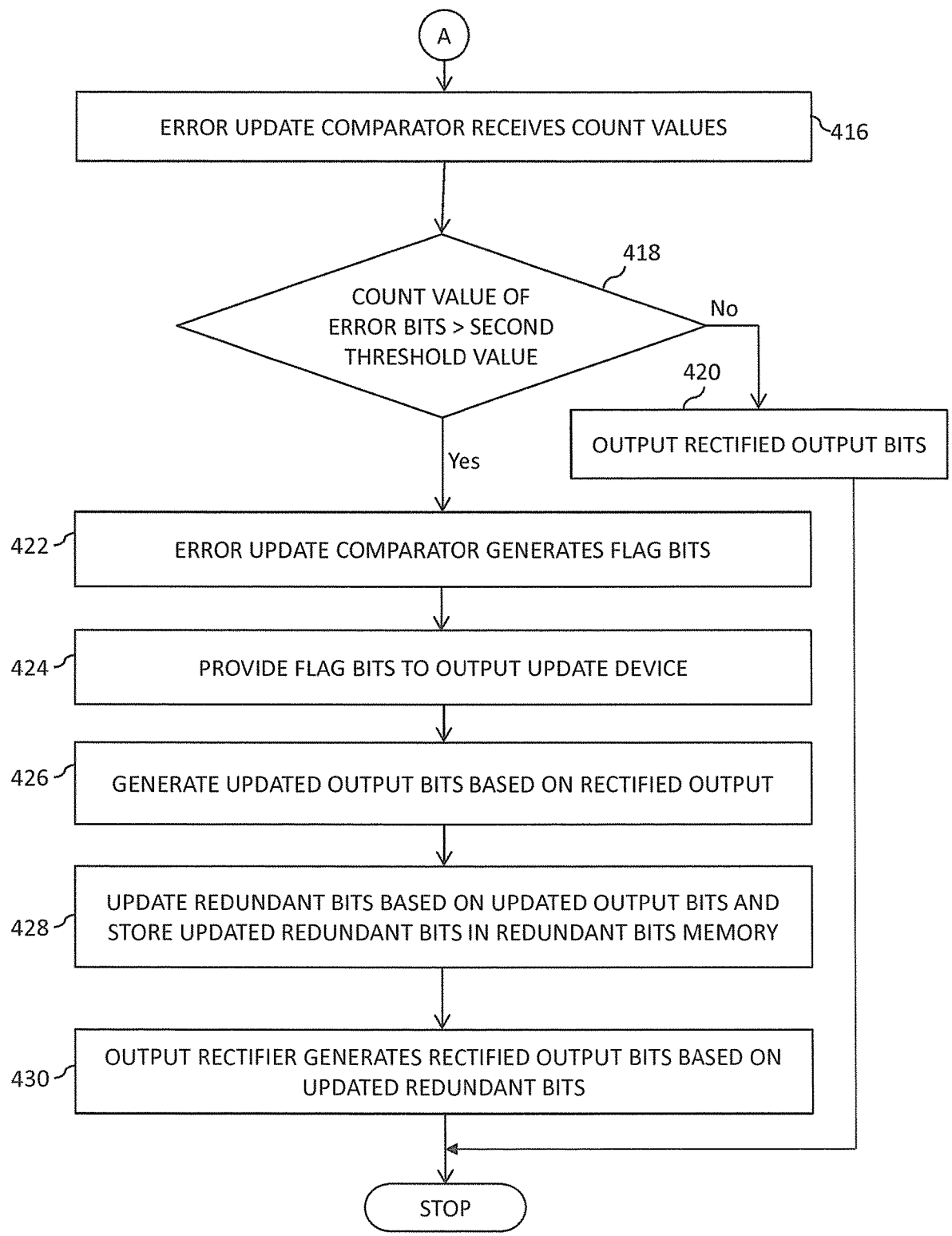

Referring now to FIGS. 4A and 4B, a flow chart of a method for updating a response, generated by a PUF circuit 102, to a challenge corresponding to the PUF circuit 102 of FIG. 2 is shown, in accordance with an embodiment of the present invention. At step 402, the PUF circuit 102 receives the set of input bits IN[0:n], and at step 404, the PUF circuit 102 generates the set of output bits OUT[0:m] based on the set of input bits IN[0:n]. The set of input bits IN[0:n] is encoded and includes an address for a set of redundant bits RED[0:k] stored in the redundant bits memory 201. At step 406, the output rectifier circuit 106 receives the set of redundant bits RED[0:k] from the redundant bits memory 201, and at step 408, the output rectifier circuit 106 generates the set of rectified output bits RECT_OUT[0:m] based on the output bits OUT[0:m] and the redundant bits RED[0:k]. In one embodiment, the output rectifier circuit 106 employs FEC coding for rectifying errors in the output bits OUT[0:m]. However, as will be appreciated by those of skill in the art, other error correction algorithms may be used either instead of or in addition to FEC.

At step 410, the error comparator 108 receives the output bits OUT[0:m] from the PUF circuit 102 and the rectified output bits RECT_OUT[0:m] from the output rectifier circuit 106, performs a bitwise comparison, and generates a set of error bits ERR[0:m] based on the comparison results. At step 412, the second error counter 202 receives and stores the error bits ERR[0:m] in the error bits memory 204. At step 414, the second error counter 202 counts the number of occurrences, per cycle of the PUF circuit 102, in which the error bits[0:m] are unchanged and generates the count values COUNT[0:m]. That is, the second error counter 202 counts the number of operation cycles for each bit of the set of error bit ERR[0:m] for which the bits remain at the same logic state.

At step 416, the error update comparator 206 receives the count values COUNT[0:m] from the second error counter 202, and at step 418, the error update comparator 206 determines if any of the count values COUNT[0:m] is greater than the second threshold value. If the error update comparator 206 determines that none of the count values COUNT[0:m] is greater than the second threshold value, the error update comparator performs step 420. At step 420, the rectified output bits RECT_OUT[0:m] are output. The error update comparator 206 further determines that the set of error bits ERR[0:m] does not include any permanent errors.

If, however at step 418, the error update comparator 206 determines that any of the count values COUNT[0:m] is greater than the second threshold value, then the error update comparator performs step 422. At step 422, the error update comparator 206 generates the set of flag bits FLAG[0:m] corresponding to the set of error bits ERR[0:m]. If any of the count values COUNT[0:m] is greater than the second threshold value, then the error update comparator 206 sets a corresponding flag bit of the set of flag bits FLAG[0:m].

At step 424, the error update comparator 206 outputs the set of flag bits FLAG[0:m] to the output update circuit 208. At step 426, the output update circuit 208 generates a set of updated redundant bits UP_RED[0:k] based on the flag bits FLAG[0:m] and the rectified output bits RECT_OUT[0:m]. At step 428, the output update circuit 208 generates the set of updated redundant bits UP_RED[0:k] based on the set of updated output bits UP_OUT[0:m] and stores the set of updated redundant bits UP_RED[0:k] in the redundant bits memory 104. At step 430, the output rectifier circuit 106 generates the set of rectified output bits RECT_OUT[0:m] for the next operation cycle of the PUF circuit 102 using the updated redundant bits UP_RED[0:k].

The error indicating circuit 100 determines if the PUF circuit 102 is able to correct any errors detected by the output rectifier circuit 106. The error indicating circuit 100 hence is able to provide an indication of when the PUF circuit 102 needs replacing. Implementation of the error indicating circuit 100 eliminates a need for physical intrusion and external monitoring of the PUF circuit 102. Further, security against physical intrusion into the PUF circuit 102 is not affected by the error indicating circuit 100. Physical intrusion of the PUF circuit 102 may introduce more permanent error bits in the set of error bits ERR[0:m]. Hence, the error count value E_COUNT is greater than the first threshold value, indicating a physical intrusion in the PUF circuit 102. The error correction circuit 200 facilitates dynamic authentication of the PUF circuit 102. Hence counterfeiting of the PUF circuit 102 is difficult as compared to a typical PUF circuit. Since the error correction circuit 200 updates the output bits OUT[0:m] with updated output bits UP_OUT[0:m], permanent errors are eliminated. Hence, the PUF circuit 102 can be used for a longer operating period despite aging of the PUF circuit 102. Further, removal of permanent errors facilitates seamless authentication.

The terms first and second logic states have been used herein to distinguish between high and low signals. For example, the first logic state could signify a signal that is 0 v, while a second logic state would then indicate a signal that has a logical '1' value, with the actual voltage value for logic 1 depending on circuit technology. The circuits described herein also can be designed using either positive or negative logic, so an active signal in one embodiment could be a logic '0' and an inactive signal would then have a logic value of '1'.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An error indicating circuit connected to a physical unclonable function (PUF) circuit, wherein the PUF circuit receives a challenge as a set of input bits and generates a response as a set of output bits, and wherein the set of input bits is encoded to provide access to a set of redundant bits stored in a redundant bits memory, the error indicating circuit comprising:

an output rectifier circuit connected to the PUF circuit and the redundant bits memory for receiving the set of output bits and the set of redundant bits, respectively, and generating a set of rectified output bits;

an error comparator connected to the PUF circuit and the output rectifier circuit for receiving the set of output bits and the set of rectified output bits, respectively, and generating a first set of error bits based on a bitwise comparison of the set of output bits with the set of rectified output bits;

a first error counter connected to the error comparator for receiving the first set of error bits and generating an error count value based on the first set of error bits;

a flag comparator connected to the first error counter for receiving the error count value and setting a flag when the error count value is greater than a first threshold value;

a second error counter connected to the error comparator for receiving a second set of error bits and generating a set of count values that indicates, for each of the error bits, a number of operation cycles of the PUF circuit for which each said bit has not changed state; and an error update comparator connected to the second error counter for receiving the set of count values, identifying count values that are greater than a second threshold value, and generating a corresponding set of flag bits, wherein a flag bit is set when the corresponding count value is greater than the second threshold value, and wherein the flag bits, when set, indicate that the corresponding error bit comprises a permanent error.

2. The error indicating circuit of claim 1, wherein the error comparator sets an error bit of the first set of error bits when an output bit of the set of output bits does not match a corresponding rectified output bit of the set of output bits, and the error count value generated by the first error counter comprises a sum of the error bits of the first set of error bits that are set.

3. The error indicating circuit of claim 1, wherein the output rectifier circuit is able to correct 'n' bits of the set of output bits and the first threshold value is n–1 or less.

4. The error indicating circuit of claim 1, wherein the flag indicates that the number of errors corrected by the output rectifier circuit is approaching a maximum number of errors correctable by the output rectifier circuit.

5. An error correcting circuit connected to a physical unclonable function (PUF) circuit, wherein the PUF circuit receives a challenge as a set of input bits and generates a response as a set of output bits, and wherein the set of input bits is encoded to provide access to a set of redundant bits stored in a redundant bits memory, the error correcting circuit comprising:

an output rectifier circuit connected to the PUF circuit and the redundant bits memory for receiving the set of output bits and the set of redundant bits, respectively, and generating a set of rectified output bits;

an error comparator connected to the PUF circuit and the output rectifier circuit for receiving the set of output bits and the set of rectified output bits, respectively, and generating a set of error bits based on a bitwise comparison of the set of output bits with the set of rectified output bits;

a second error counter connected to the error comparator for receiving the set of error bits and generating a set of count values that indicates, for each of the error bits, a number of operation cycles of the PUF circuit for which each said bit has not changed state; and an error update comparator connected to the second error counter for receiving the set of count values, identifying count values that are greater than a second threshold value, and generating a corresponding set of flag bits, wherein a flag bit is set when the corresponding count value is greater than the second threshold value, and wherein the flag bits, when set, indicate that the corresponding error bit comprises a permanent error.

6. The error correcting circuit of claim 5, further comprising an error bits memory connected to the second error counter, wherein cumulative count values for each of the error bits are stored in the error bits memory.

7. The error correcting circuit of claim 5, wherein the second error counter increments a count value when an error bit does not change state, and decrements the count value when the error bit does change state.

8. The error correcting circuit of claim 5, further comprising an output update circuit connected to the error update comparator for receiving the flag bits and generating a set of updated output bits based on the flag bits.

9. The error correcting circuit of claim 8, wherein the output update circuit inverts the permanent error bits to generate the set of updated output bits.

10. The error correcting circuit of claim 9, wherein the updated output bits are output from the error correcting circuit and wherein the updated output bits indicate that for a next usage of the PUF circuit, the rectified output will include a correction of the permanent error.

11. The error correcting circuit of claim 8, further comprising a redundant bits update circuit connected to the output update circuit for receiving the updated output bits, wherein the redundant bits update circuit generates a set of updated redundant bits based on the updated output bits and stores the updated redundant bits in the redundant bits memory.

12. The error correcting circuit of claim 11, wherein in later operation cycles of the PUF circuit, the output rectifier circuit generates the rectified output bits using the updated redundant bits stored in the redundant bits memory.

13. The error correcting circuit of claim 5, wherein the redundant bits memory is part of the error correcting circuit, and the redundant bits memory comprises a programmable read-only-memory (ROM).

14. A method for determining health of a physical unclonable function (PUF) circuit, wherein the PUF circuit receives a challenge as a set of input bits and generates a response as a set of output bits, the method comprising:

generating a set of rectified output bits with an output rectifier circuit using the set of output bits and a set of redundant bits;

comparing the set of output bits with the set of rectified output bits by an error comparator to generate a first set of error bits, wherein an error bit of the first set of error bits has a first value if the corresponding output bit matches the corresponding rectified output bit, and said error bit of the first set of error bits has a second value if the corresponding output bit does not match the corresponding rectified output bit;

generating an error count value with a first error counter, wherein the error count value is a sum of the number of bits of the set of error bits that have the second value;

comparing the error count value with a first threshold value;

setting a flag if the error count value is greater than the first threshold value, whereby the flag provides an indication of the health of the PUF circuit;

generating a set of count values corresponding to a second set of error bits over a plurality of operation cycles of the PUF circuit with a second error counter, wherein the second set of error bits corresponding to a number of operation cycles over which each error bit remains at a constant logic state;

comparing each count value of the second set of count values with a second threshold value with an error update comparator; and determining an error bit of the second set of error bits to be a permanent error based on the corresponding count value exceeding the second threshold value.

15. The method of claim 14, wherein the output rectifier circuit is able to correct 'n' bits of the set of output bits and the first threshold value is n−1 or less.

16. The method of claim 14, further comprising generating a set of flag bits corresponding to the one or more permanent errors in the set of error bits by the error update comparator.

17. The method of claim 16, further comprising generating a set of updated output bits based on the flag bits and the rectified output bits, with an output update circuit.

18. The method of claim 17, wherein the output update circuit inverts the permanent error bits to generate the set of updated output bits, and wherein the updated output bits indicate that for a next usage of the PUF circuit, the rectified output includes a correction of the one or more permanent errors.

19. The method of claim 17, wherein the set of redundant bits provided to the output rectifier circuit is stored in a redundant bits memory, the method further comprising:
generating a set of updated redundant bits from the updated output bits; and
writing the updated redundant bits to the redundant bits memory.

* * * * *